(12) United States Patent
Wheeler (10) Patent No.: US 10,467,582 B2
(45) Date of Patent: Nov. 5, 2019

(54) METHOD AND ARTICLES FOR IN-STORE SHELF MERCHANDISE IDENTIFICATION AND MAPPING

(76) Inventor: Phillip J Wheeler, Gallatin, TN (US)

( * ) Notice: Subject to any disclaimer, the term of this patent is extended or adjusted under 35 U.S.C. 154(b) by 1965 days.

(21) Appl. No.: 12/401,047

(22) Filed: Mar. 10, 2009

(65) Prior Publication Data

US 2009/0234668 A1 Sep. 17, 2009

Related U.S. Application Data

(60) Provisional application No. 61/035,895, filed on Mar. 12, 2008, provisional application No. 61/060,561, filed on Jun. 11, 2008, provisional application No. 61/141,293, filed on Dec. 30, 2008.

(51) Int. Cl.
*G06Q 30/02* (2012.01)
*G09F 3/20* (2006.01)
*G06Q 10/08* (2012.01)

(52) U.S. Cl.
CPC ....... *G06Q 10/087* (2013.01); *G06Q 30/0281* (2013.01); *G09F 3/204* (2013.01)

(58) Field of Classification Search
CPC .... G06Q 10/087; G06Q 30/0281; G09F 3/00; G09F 3/204
USPC .................................................. 705/1.1, 346
See application file for complete search history.

(56) References Cited

U.S. PATENT DOCUMENTS

| | | | |
|---|---|---|---|
| 5,339,153 A * | 8/1994 | Kane et al. | 356/394 |
| 5,423,617 A * | 6/1995 | Marsh et al. | 400/82 |
| 5,582,433 A | 12/1996 | Sisson | |
| 5,642,666 A * | 7/1997 | Petteruti et al. | 101/288 |
| 6,632,316 B1 | 10/2003 | Garvic | |
| 7,009,723 B1 * | 3/2006 | Bartholet et al. | 358/1.15 |
| 7,287,001 B1 * | 10/2007 | Falls et al. | 705/22 |
| 2005/0010499 A1 * | 1/2005 | Farkas | G06Q 10/087 705/28 |

OTHER PUBLICATIONS

Miyazaki, Anthony, Sprott, David, Manning, Kenneth, "Unit Prices on Retail Shelf Labels: An Assessment of Information Prominence" Journel of Retailing, vol. 76, Issue 1, Spring 2000, pp. 93-112 (Year: 2000).*
Foxfire Printing and Packaging, Inc., Internet Article, available at: http://www.foxfireprinting.com/shelfstrip.htm, last accessed on Feb. 8, 2011.
Lexmark, Internet Article, available at: http://www.lexmark.com/vgn/images/portal/Plano.pdf , last accessed on Feb. 8, 2011.
Salem Technologies, Inc., Internet Article, available at: http://www.salemtech.net/strips2.htm, last accessed on Feb. 8, 2011.

\* cited by examiner

*Primary Examiner* — Carrie S Gilkey
(74) *Attorney, Agent, or Firm* — The Dobrusin Law Firm, P.C.; Daniela M. Thompson-Walters (57) ABSTRACT

A merchandise information system and printing method is disclosed that allows for retail merchandise information to be printed in a web format and separated into merchandise information strips to be wound around a core or self-wound. The wound merchandise information is customized to be printed and wound in an order that corresponds to the layout of a retail establishment. The wound merchandise information is shipped to the retail establishment in wound form and can be easily applied to the shelves within the retail establishment.

13 Claims, 5 Drawing Sheets

METHOD AND ARTICLES FOR IN-STORE SHELF MERCHANDISE IDENTIFICATION AND MAPPING

CLAIM OF PRIORITY

The present invention claims the benefit of the priority of U.S. Provisional Application Ser. Nos. 61/035,895 filed Mar. 12, 2008, 61/060,561 filed Jun. 11, 2008, and 61/141,293 filed Dec. 30, 2008, the contents of which are incorporated by reference herein.

FIELD OF THE INVENTION

This invention relates to a system for providing merchandise information and for applying the merchandise information to retail shelving or other organizational displays. More particularly, the invention relates to providing merchandise information via a wound strip of printed merchandise information, wherein the merchandise information is printed in a specified sequence according to the product layout of a retail establishment and the strip of printed merchandise information is placed on merchandise shelving or displays according to the product layout.

BACKGROUND OF THE INVENTION

In order to simplify the identification of retail shelves, suppliers of point of sale shelf merchandise identification systems commonly print strips of paper, plastic or film substrates that run from about 6 inches (about 15 cm) to about 50 inches (about 127 cm) in length. Traditionally, offset printing equipment is used to print the strips, where a printing plate is created for each color. The multiple printing plates, usually anywhere from 4 to 12 different color plates, are then installed into the press which produces large sheets containing multiple shelf strips. These sheets are commonly perforated or die cut or slit and then bundled for delivery to the appropriate retail establishment. The offset printing process is wrought with a number of limitations. For example, the length of each strip is limited by the length of the sheets produced by the color press. The length of the sheets are limited to the size of the press machines and thus can only produce strips up to about 130 cm in length. Further limitations include the finite information that can be printed on each strip. Once the plates are installed onto the press, only the images from those plates can be printed until a new set of plates is designed and installed. Therefore, the amount of product information that can be printed onto one strip is extremely limited.

Recently, digital print equipment has become an option for printing shelf strips. A substrate is generally fed from a roll through a digital printer producing a sheet of multiple strips, which are subsequently fed through a sheeting device to be stacked and cut to form strips of the same size as those resulting from offset print equipment. While digital print techniques remove the need for printing plates the technology continues to produce sheets of limited size that must be stacked and cut.

Regardless of the method of printing, once printed and cut, the individual strips are typically ordered according to a predetermined sequence, stacked, and taped or rubber banded together for shipment, and thus usually present themselves to a retailer as a stack of strips. The "bundle" can be 4 to 25 strips in height. Once arriving at the point of sale, the boxes of strips are unloaded and delivered to the shelf locations. During delivery to the shelf locations the tape or bands holding the stacks of strips together have the potential for becoming corrupted (e.g., removed or damaged), which may de-stabilize some stacks. Such stacks may become out of order and can become mixed as they are being used. This creates the need for employee judgment to verify that the correct strip is going in the correct location to avoid incorrect identification of merchandise. The failure of a retailer to properly correlate merchandise information with displayed product could have expensive consequences.

Some strips are pre-printed by a strip supplier onto paperboard panels of about one meter in length which are then stacked on skids and delivered to a retailer. The retailer than separates the individual strips from the panels and sorts the strips and locates them accordingly. Again, employee judgment and intensive labor steps are required.

An example of a strip system can be found in the Shelf Strip™ products provided by Foxfire Printing of Newark, Del. (http://www.foxfireprinting.com/shelfstrip.htm). The 1.4 m long shelf strips provided by Foxfire include pricing and product images at pre-set intervals according to a point of sale's layout. The strips are delivered pre-cut and organized by department according the layout of a particular point of sale as described above in paragraph 002.

Another product is produced by Lexmark International, Inc. of Lexington, Ky. (Lexmark's Planogram Shelf Strips™ at http://www.lexmark.com/vgn/images/portal/Plano.pdf), and provides 1 to 3 meter strips that also contain pricing information and product images for ease of distribution of retail goods onto the appropriate shelves. The information is placed on the strips according to point of sale layout with a pre-set amount of space between each product.

It would be valuable to use a print system that allows for printing strips of massive lengths (e.g., where one strip could contain merchandise information for an entire retail establishment), while minimizing packaging size and reducing employee labor, employee judgment, or both. It would also be valuable to have a system that is compact for shipping, handling, or both. It would even be further attractive to have a system by which the integrity of the printed merchandise information can be kept substantially intact throughout one or any combination of the printing, shipping, or shelving processes.

SUMMARY OF THE INVENTION

In a first aspect, the present invention contemplates a method for providing merchandise information at a retail establishment comprising the steps of receiving data from one or more retail establishments wherein the data includes product details about one or more products sold at the retail establishment and the location of the one or more products within the retail establishment; using the data from the one or more retail establishments to create one or more electronic files containing merchandise information to be printed onto a substrate, wherein each electronic file includes merchandise information relating to more than one product and each electronic file contains product location identifiers so that the merchandise information will be printed in an order that corresponds with the location of products within the retail establishment; grouping the one or more electronic files into one or more print groupings so the electronic files in the same print grouping will be printed simultaneously onto the substrate; providing a substrate of adequate size so that at least one print grouping can be printed onto the substrate such that a first electronic file within the at least one print grouping is printed in a first horizontal row and subsequent electronic files within the at least one print grouping are printed in adjacent horizontal rows; printing at least one print grouping onto a substrate so that each of the adjacent horizontal rows is capable of containing all necessary merchandise information for an entire retail establishment wherein the sequence of the printed merchandise information within one horizontal row is consistent with product location within one corresponding retail establishment; separating each horizontal row from any adjacent horizontal rows; spooling each horizontal row into one or more merchandise information rolls; transporting the one or more merchandise information rolls to one or more retail establishments for installation onto shelving, so that the merchandise information can be immediately attached the shelving or displays of the retail establishment without first organizing the merchandise information according to product location within the retail establishment.

This aspect may be further characterized by one or any combination of the following features: each of the adjacent horizontal rows contains similar or identical merchandise information; the one or more merchandise information rolls are each distributed to one or more corresponding retail establishments; the one or more merchandise information rolls are each distributed to a different location of the same retail establishment; the merchandise information roll is printed onto an adhesive material and includes a liner; the merchandise information is printed onto both sides of the adjacent horizontal rows; the one or more merchandise information rolls are spooled around a core or self-wound; the printed horizontal rows are wound directly from a printer prior to separation; the product details received from the retail establishment include bar code information, RFID information, or both; the one or more merchandise information rolls are free of any marking indicative of spacing along shelving or between products.

In another aspect, the present invention contemplates a method for providing merchandise information at a retail establishment comprising the steps of: providing data to a supplier of merchandise information rolls wherein the data includes product details about one or more products sold at a retail establishment; providing location information to the supplier identifying the location of the one or more products within the retail establishment; receiving one or more merchandise information rolls at the retail establishment, wherein the one or more merchandise information rolls include merchandise information reflecting the product details provided to the supplier and wherein the sequence of the merchandise information on the one or more merchandise information rolls reflects the location information provided to the supplier; identifying a location within the retail establishment identified on or in conjunction with the one or more merchandise information rolls, wherein the merchandise information can be immediately attached to shelving or displays of the retail establishment without first organizing the merchandise information according to product location within the retail establishment; attaching the merchandise information to an edge of a first shelf, wherein the edge is shaped to accept the merchandise information; locating merchandise onto the shelves according to the merchandise information; selling the merchandise.

This aspect may be further characterized by one or any combination of the following features: the merchandise information rolls are spooled around one or more cores or are self-wound; wherein the product details include bar code information, RFID information, or both; the product details include images of retail products to be placed upon corresponding shelves; the product details include images of retail products to be placed upon corresponding shelves; the one or more merchandise information rolls are free of any marking indicative of spacing along shelving or between products.

In a further aspect, the present invention contemplates a kit for providing merchandise information on shelving or displays within a retail establishment comprising a product layout that identifies the location within a retail establishment where merchandise is to be displayed and a merchandise information roll, wherein the merchandise information roll includes an indicator allowing a user to identify the location within a retail establishment where the merchandise information roll should be placed.

This aspect may be further characterized by one or any combination of the following features: the merchandise information roll is free of any marking indicative of spacing along shelving or between products; the merchandise information can be immediately attached to shelving or displays of the retail establishment without first organizing the merchandise information according to product location within the retail establishment; wherein the kit further includes a means for attaching merchandise information to shelves or displays within a retail establishment and the merchandise roll is printed onto one horizontal row which is capable of containing all necessary merchandise information for an entire retail establishment wherein the sequence of the printed merchandise information within one horizontal row is consistent with product location within one corresponding retail establishment.

The present invention also contemplates as an aspect a kit for practicing any of the methods taught herein.

Any combination of the above aspects of the invention (and their respective additional characteristics) are also contemplated by the present teachings.

DESCRIPTION OF THE PREFERRED EMBODIMENT

The present invention in a broad sense addresses a unique approach to the display of merchandise information within retail establishments and the coordinated management of inventory with such displays. Examples of retail establishments within the teachings of the present invention are pharmacies, grocery stores, mass marketing retailers, club warehouses (e.g., Costco, Sam's Club, etc.), convenience stores and the like. The merchandise information incorporated on displays and shelving within these retail establishments may include but is not limited to merchandise price, type, brand name, generic name, quantity, size, sale data, images, machine readable information, promotions, incentives, coupons or any combination thereof. The present invention further provides a unique approach to merchandise information kits and methods of printing, shipping and placing merchandise information. Though other information is within the present teachings, in general, the invention is directed to managing printed information about merchandise and particularly merchandise inventories maintained by a retailer for sale and/or distribution to customers (e.g. customers of consumer products).

A typical retail environment will have shelving, displays or other hardware upon which inventories are placed for viewing by customers. Such hardware will often include surfaces upon which information about merchandise can be displayed. One particular approach is to display merchandise information by way of a printed information strip. The present invention contemplates the printing of these strips as among the steps of the unique methods.

Figure 1:
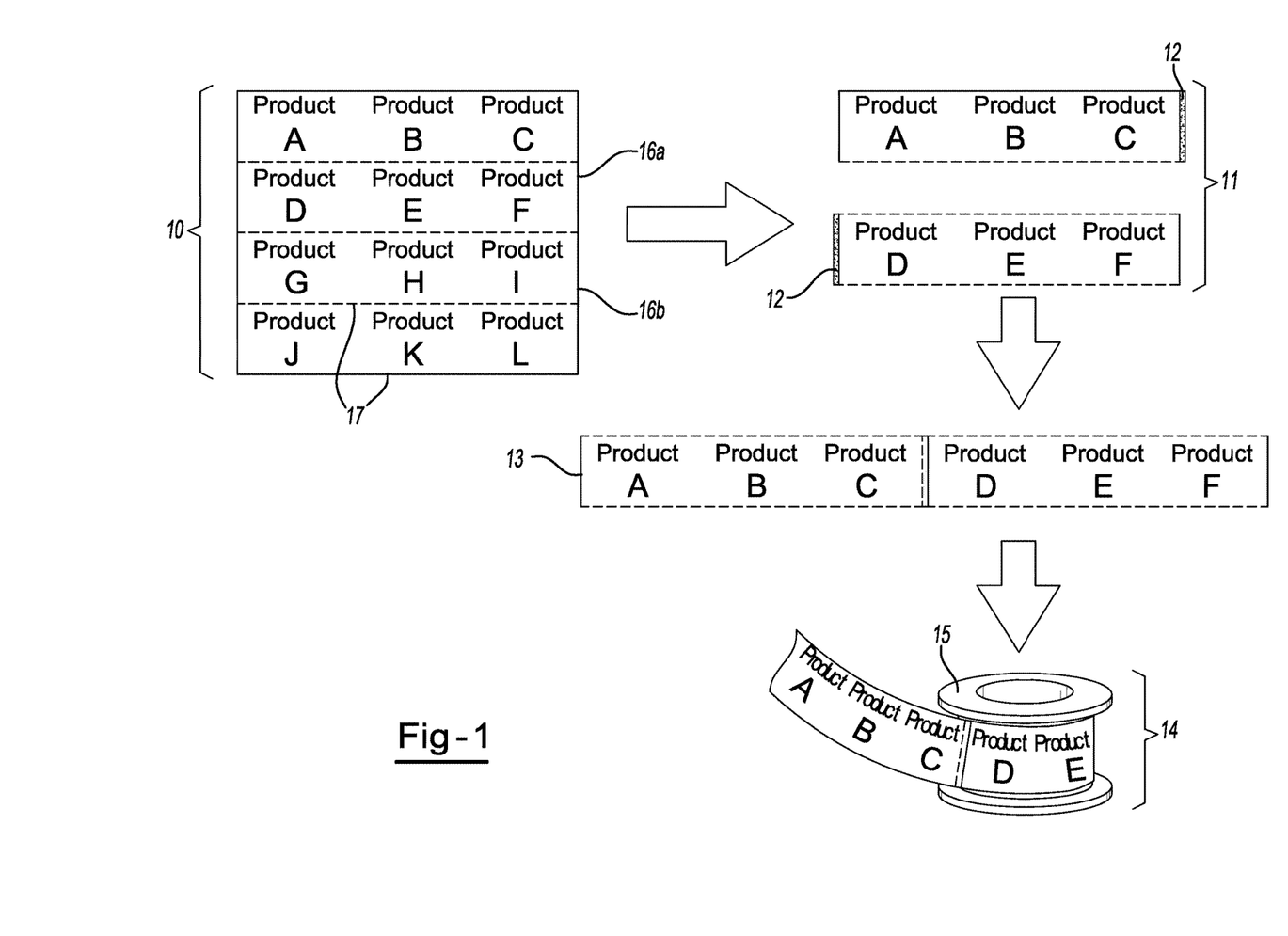
FIG. 1 is an embodiment of the present invention showing conversion of the merchandise information from a web format to a roll.

Preferably, as displayed in FIG. 1, the printing is performed in web print format 10 using digital print equipment. The web print format 10 allows for multiple strips to be printed at once, each strip being horizontally attached to other strips. Preferably, a substrate is fed through digital print equipment from a wound format. The merchandise information may then be printed onto the substrate in one or more rows and the substrate may be subsequently re-wound after printing is completed, so that the length of the strips is not limited by page size. The use of digital printing in a roll-to-roll format (e.g., where the substrate is initially wound, then un-wound through the printing equipment and then re-wound after printing) allows for the printing of one or a minimal number of strips that contain all merchandise information for an entire retail establishment. Preferably, the substrate of the present invention will not come into contact with a sheeting device or any other device that results in short-length strips that require stacking for shipment to a retailer.

After the printing step is completed, the web print format 10 may be separated into merchandise information strips 11 that are either formed (e.g., cut) immediately after printing and subsequently wound into rolls, or wound immediately after printing (e.g., as in a roll-to-roll format) and subsequently cut into rolls containing only one horizontal row of merchandise information. Alternatively, these strips may be printed and subsequently attached to one another at predetermined attachment points 12 according to a point of sale layout as discussed in detail below. Preferably, the successive strips are attached to one another via any means for attachment that still allows the strips to be separated without damage to the merchandise information, such as varnish, glue or resin. In a preferred embodiment, the merchandise information strips are printed in one continuous strip 27 and each strip is spooled and shipped separately. The attached strips 13 or continuous strips 27 are then preferably wound into a roll format 14. The roll format 14 may surround a core 15 or any type of holder or may be self-wound.

Preferably, the merchandise information is printed in a web format where rows or strips 16a of merchandise information are attached to other rows or strips of merchandise information 16b at the top of the strip, the bottom of the strip, or both. This allows for simultaneous printing of numerous merchandise information strips. After printing, the strips may be separated. The strips may have perforated edges 17 to allow for easy separation of the strips, or the strips may be cut or separated in some other fashion. The separation may be performed by a machine or by hand. More preferably, the printer will include a mechanism that automatically separates the strips after printing or after the strips are wound.

Figure 4:
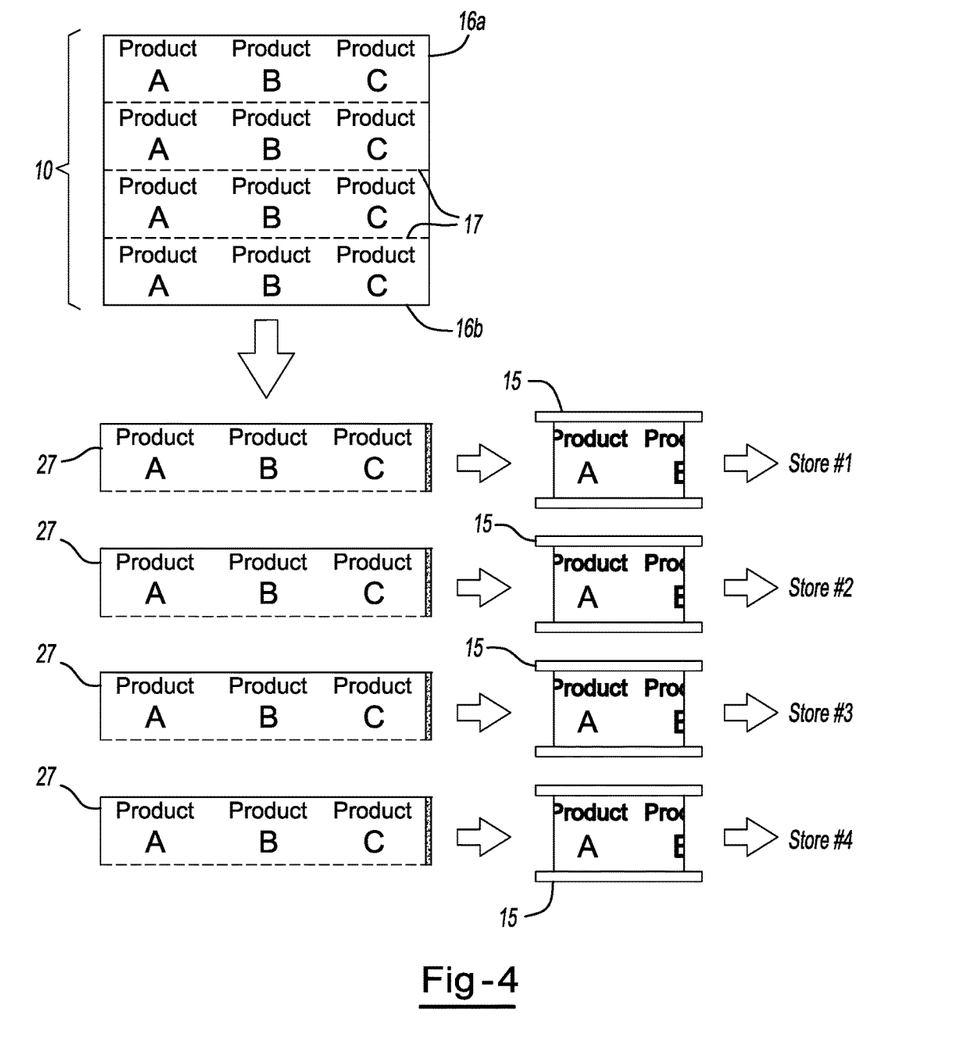
FIG. 4 depicts an example showing conversion of the merchandise information from a web format and subsequent distribution to retail establishments.
Figure 5:
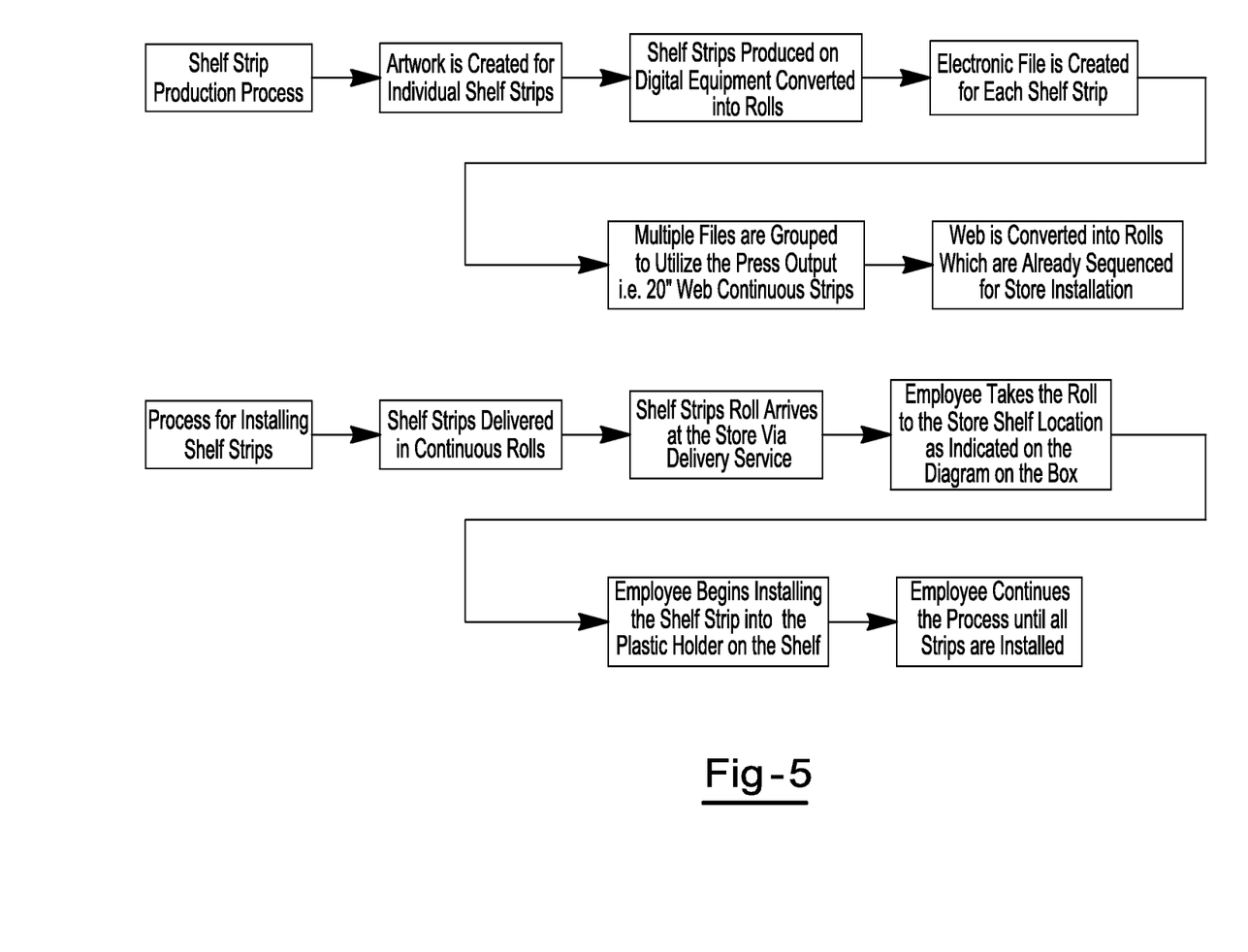
FIG. 5 is a flow diagram depicting the shelf strip production and installation processes.

Preferably, the order of the strips should be maintained according to the layout. Each strip may be spooled individually as shown in FIG. 4, or each strip may be attached to additional strips in an appropriate order and spooled into a roll of merchandise information 14. In one preferred embodiment, each spooled strip is sent to a different retailer or more preferably, a different branch of the same retailer. In another preferred embodiment, the rows printed in a web format are each identical rows that are separated, spooled, and each sent to a different branch of the same retail establishment, so as to maintain continuity between branches. Preferably, the roll of merchandise information 14 can be shipped from a supplier to a retail establishment in packaging that is smaller and less cumbersome than the traditional packaging used to ship the strips in a panel or individual strip. Shipping the spooled merchandise information in roll form will also reduce the in-transit damage to the merchandise information that is common among stacked merchandise information.

The material used for the printed merchandise information can be any type of flexible substrate material traditionally used to print retail merchandise information. The merchandise information may be printed onto paper, cardboard, plastic, plastic film, a metalized film, foil, or any combination thereof. The merchandise information may also be printed onto any type of plastic material to reduce the risk of damage to the merchandise information. However, the materials used for the merchandise information must be pliable enough to allow for the merchandise information strips to be spooled after printing; that is, it will be capable of plastically and/or elastically deforming during winding and will avoid fracture, kinking, or other disruptions to a substantially continuous profile outer surface.

The merchandise information may also be printed onto a flexible substrate and fastened to a non-flexible substrate during a subsequent step, such as by merchandise display personnel during the setup of a product display or at any time after spooling and shipping. The merchandise information may be printed directly onto an adhesive material layer to which a flexible substrate liner is attached. The flexible substrate liner may then be removed from the adhesive merchandise information and placed at the appropriate location at a point of sale. Preferably, sequential merchandise information to be printed directly adjacent to one another regardless of actual distance between products at a point of sale, such that the distance between sequential merchandise information would be specified on an associated chart or planogram. This would in turn reduce the length and overall size of a merchandise information roll. The liner may even include ruler markings to assist an installer in determining distance between adjacent merchandise information.

The type of information that is printed on the merchandise information roll may differ depending on the needs of a particular seller. The merchandise information may include basic data such as the product name, cost per unit and an item barcode or RFID identification. The merchandise information may contain any identifying information to assist an employee of a retail establishment in placing the correct stock in the correct shelf location. The merchandise information may include an image of the product for ease in stocking the shelves or organizational units.

Figure 2:
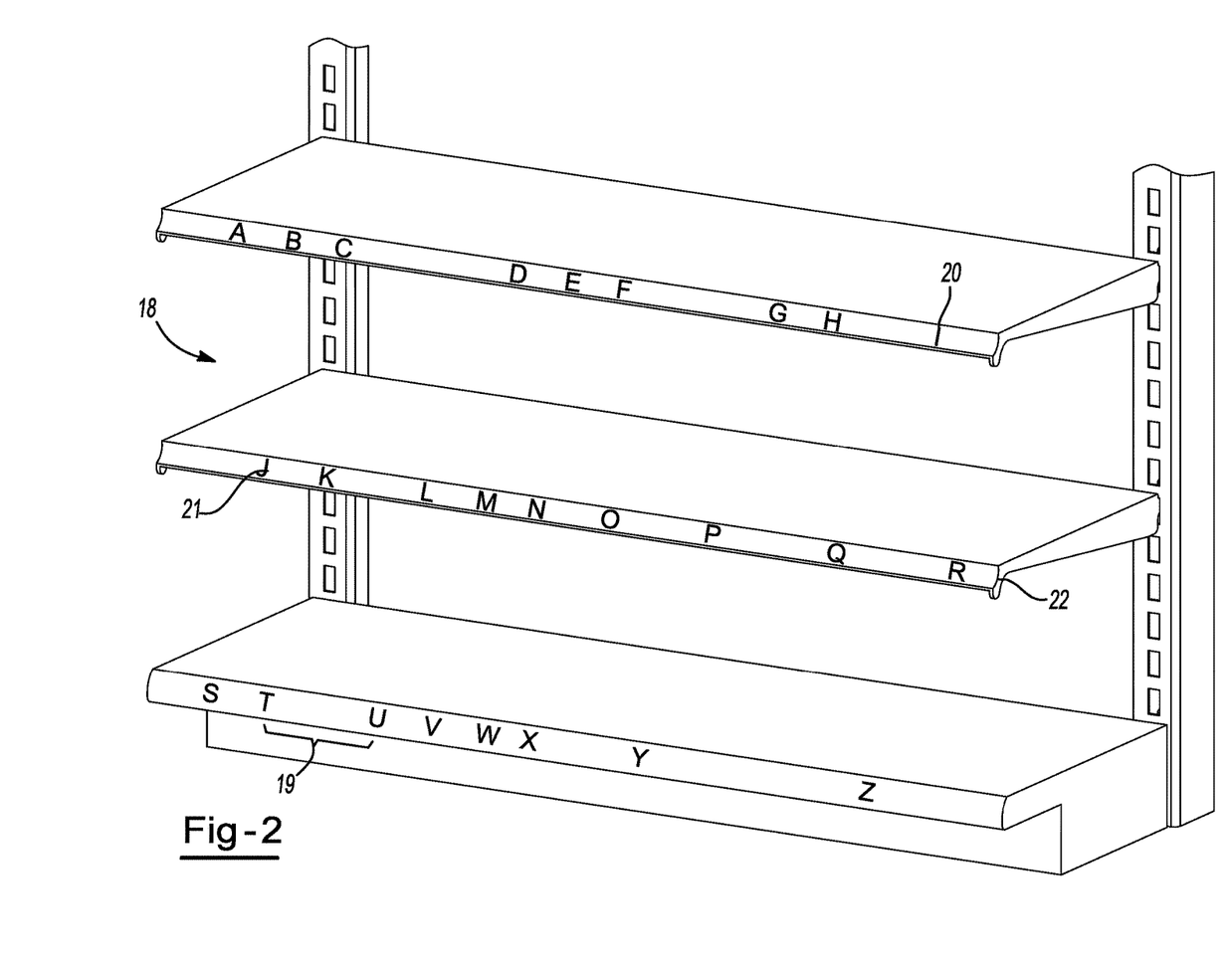
FIG. 2 is a view of an example of a retail aisle post-merchandise information placement.

Turning to FIG. 2, in order to determine the order in which the strips are printed and/or subsequently wound, a retailer provides a product layout 18 of the point of sale to a supplier of the merchandise information. A step is thus employed of correlating information from the product layout with the location of merchandise information within a merchandise information roll. Preferably, the product layout includes the location of all shelving or similar organizational structures within the retail establishment, which products are to be placed on each section of shelving, and how far apart 19 each merchandise information item must be from the previous and subsequent merchandise information. The merchandise information is then printed according to the layout provided by the retailer, so that products that are located next to one another in a particular aisle will be printed next to each other on the merchandise information strip. Preferably, the merchandise information will be printed by aisle, so that the last item of merchandise information 20 at the end of a particular aisle top shelf will be followed by the first merchandise information item 21 to be placed at the beginning of the next shelf located below the top shelf. More preferably, the merchandise information can be cut, torn or designed with a perforation 22 at the end of every shelf aisle to allow a point of sale employee to return to the beginning of the aisle to unroll the next strip of consecutive merchandise information.

Upon receiving the roll of merchandise information 14, a seller can immediately access the roll and begin applying the spooled strips to the appropriate shelving or organizational units without any further separating or organizing of the merchandise information strips. The employees can review the layout and use it as directions. The employee may be able to derive all directions from the strips without the need to resort to the layout. The spooled strips typically can be already in the appropriate order so there is no need for a retail establishment employee to sort through a stack of merchandise information strips to find the appropriate merchandise information. In another preferred embodiment, in the event that the layout of a retail establishment shifts slightly prior to installation of the merchandise information strips, any merchandise information that should be moved to a new location according to an updated layout can simply be removed from a roll during placement of the spooled merchandise information and placed in its correct spot. The spooled strips may then continue to be unrolled onto the shelving or organizational units. One spool of merchandise information can contain the merchandise information for one aisle, many aisles, or an entire store depending on the needs of the retail establishment. Preferably, the number of aisles per spool is maximized to reduce the cost and size of shipping the spooled merchandise information.

Providing merchandise information on the organizational units or shelving as opposed to directly on the product packaging benefits a retailer because it allows for ease in manipulating the merchandise information according to the constant changes that occur within the product information. As price, barcode, or RFID information changes on a given product, the retail establishment need only order and install a new roll of merchandise information item as opposed to replacing multiple shorter length strips at various inconsistent locations within a retail establishment, or somehow covering any existing merchandise information applied directly to product packaging. This results in a substantial savings in employee labor.

Figure 3:
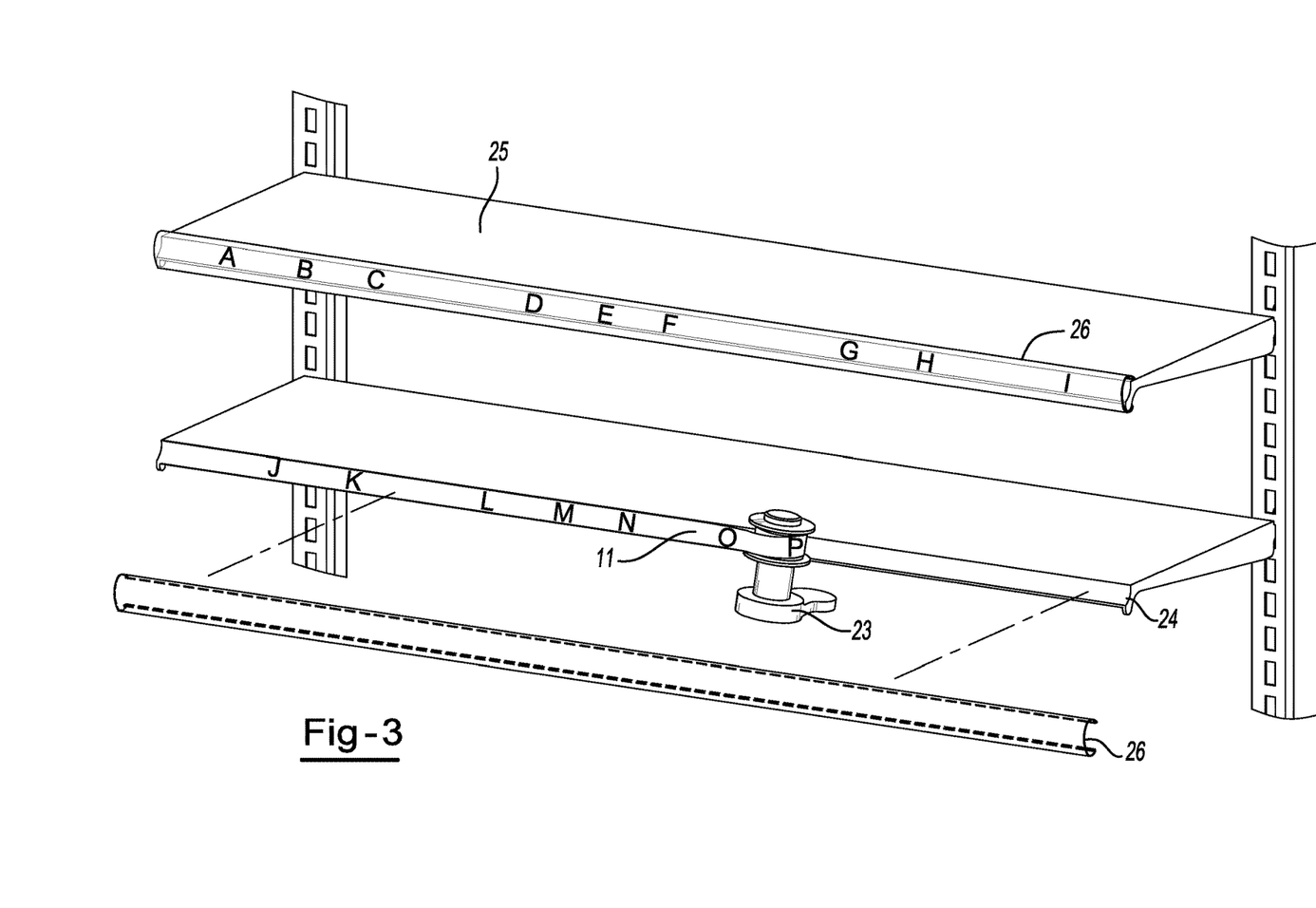
FIG. 3 is a view of an illustrative merchandise information applicator and shelf edge.

Turning to FIG. 3, in one preferred embodiment, the roll can be placed on an industrial tape-type dispenser or any means for attaching the merchandise information to shelving or other display units. The roll of merchandise information can be preloaded by the supplier onto an application device 23 that allows for simplified placement of the merchandise information. Alternatively, the application device 23 can be shipped separately. The application device 23 may be designed to connect to the core of a merchandise information roll, or may be designed to attach to the merchandise information roll itself (e.g., where the application device is able to connect to a roll that is self-wound). The application device may include a top portion, a spindle portion and a bottom portion, wherein the top portion and/or bottom portion may be removable to allow for simplified attachment to a merchandise information roll. The top portion and/or bottom portion may also function to prevent a merchandise information roll from becoming disengaged from the application device. The application device may also include only a top and bottom portion with no spindle portion so that a merchandise information roll is held in place by only the top portion and bottom portion. The application device may also be fitted with mechanism for cutting or separating one portion of a merchandise information roll from a second portion of a merchandise information roll. The application device may also include a ratchet to control the rate and/or amount of merchandise information being dispensed. The application device 23 can be disposable after a single use, or may be designed to accept new merchandise information rolls after an initial merchandise information roll has been applied. Preferably, the application device 23 can be used repeatedly for many subsequent rolls to further reduce the cost and shipping size of the merchandise information rolls.

The shelves or organizational units of a retail establishment often include shelf strip holders 24 that not only draw attention to the shelves 25, but are designed to accept the merchandise information strips. The application device 23 may contain a means for temporarily separating the layers 26 of a shelf strip holder 24 and inserting a strip of merchandise information 11 into the shelf strip holder 24. The means for temporarily separating the layers of a shelf strip holder may be prong attached to the application device, such that the prong comes into contact with and separates the layers of the shelf strip holder prior to any merchandise information being dispensed into the shelf strip holder. The means may also include an adhesive that is able to lift and separate the shelf strip holder prior to inserting the merchandise information.

In another preferred embodiment, the merchandise information strips may contain product information on both sides of the strips. More preferably, the product information on both sides of the strips may be seasonal in nature, with one side containing product information on one seasonal product (e.g. Halloween products) or the like, and the other side containing information on a different seasonal product (e.g. Thanksgiving products) or the like. This would simplify the turnover of seasonal shelving from one season to the next by allowing the merchandise information strips to simply be reversed so that the opposite side of the strip is now visible to customers, as opposed to incurring the time and cost associated with ordering, printing, shipping and installing new merchandise information.

The methods for providing merchandise information disclosed herein are free of any digital or electronic videos or displays. The merchandise information rolls are not connected to a communication network or any power supply. The merchandise information rolls of the present invention are wound and are not arranged in four foot strips. Further, the merchandise information rolls of the present invention are free of space indicators or any markings on the rolls that indicate the spacing between products.

In another preferred embodiment, the merchandise information rolls can be ordered from a supplier via the internet. The steps would include displaying a home page and prompting a user to advance to one or more pages for selecting each variable of a merchandise information roll, including the product data to be displayed, the layout of the retail establishment, the distance between successive products and any other appropriate variable. When a user selects "product data" they will be presented with a list of options that may include such as product bar code, RFID identifier, product name, product price, product image, and any other product information that may be included on the merchandise information Product images may be selected from a pre-loaded catalogue of goods or may be uploaded by a user. Preferably, the website will allow for any or all of this information including product images, RFID identifiers, and bar codes to be downloaded from existing data maintained by the point of sale. This process will continue until all possible parameters of the merchandise information have been chosen. As a retailer is making the selections the web site may be visually displaying the selection, either as an individual feature, as part of an entire strip or both. In this manner, a retailer may be able to view the intended product. Of course, the entire transaction, including payment, billing and shipping notices can be conducted over a secure site.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention, should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations and arrangements are also possible as will be gleaned from the following claims, which are also hereby incorporated by reference into the written description. The use of terms such as "first", "second", "a" or "an" does not preclude the presence of additional items.

What is claimed is:

1. A method for providing merchandise information at a retail establishment comprising the steps of:
    a) receiving data from one or more retail establishments wherein the data includes product details about a plurality of products sold at the one or more retail establishments and a location of the plurality of products within the one or more retail establishments;
    b) using the data from the one or more retail establishments to create one or more electronic files containing the merchandise information to be printed onto a substrate, wherein each electronic file includes the merchandise information relating to more than one product and each electronic file contains product location identifiers so that the merchandise information will be printed in an order that corresponds with the location of the plurality of products within the one or more retail establishments;
    c) grouping the one or more electronic files into one or more print groupings so the electronic files in a same print grouping that correspond to one complete retail establishment or multiple aisles of an individual retail establishment will be printed onto one substrate;
    d) providing the substrate including a plurality of separable rows so that at least one print grouping can be printed onto the substrate such that a first electronic file within the at least one print grouping is printed in a first horizontal row and subsequent electronic files within the at least one print grouping are printed in adjacent horizontal rows;
    e) printing on a printer the at least one print grouping onto the substrate, wherein each of the adjacent horizontal rows is capable of containing all necessary merchandise information for an entire retail establishment or for multiple aisles within the individual retail establishment, and wherein a sequence of the printed merchandise information within one horizontal row is consistent with product location within one corresponding retail establishment;
    f) separating each horizontal row from any of the adjacent horizontal rows by a mechanism that automatically separates the horizontal rows;
    g) spooling each horizontal row into one or more merchandise information rolls;
    h) providing the one or more merchandise information rolls with an indicator allowing a user to identify the location within the retail establishment where the one or more merchandise information rolls should be placed;
    i) transporting the one or more merchandise information rolls to the one or more retail establishments for installation onto shelving;
    j) attaching the one or more merchandise information rolls to shelving or displays of the retail establishment by an application device by unspooling the one or more merchandise information rolls as the one or more merchandise information rolls are applied without first organizing the merchandise information according to product location within the retail establishment, so that the merchandise information can be immediately attached to shelving or displays upon receipt, wherein the application device can be connected to a core of the one or more merchandise information rolls or be connected to self-wound merchandise rolls; and
    wherein the one or more merchandise information rolls is printed onto an adhesive material and includes a flexible substrate liner, wherein ruler markings are printed onto the flexible substrate liner to assist an installer in determining distance between adjacent merchandise information.

2. The method according to claim 1, wherein each of the adjacent horizontal rows contains similar or identical merchandise information.

3. The method according to claim 1, wherein the one or more merchandise information rolls are each distributed to one or more corresponding retail establishments.

4. The method according to claim 2, wherein the one or more merchandise information rolls are each distributed to a different location of the same retail establishment.

5. The method according to claim 1, wherein the merchandise information is printed onto both sides of the adjacent horizontal rows, wherein the adjacent horizontal rows of the merchandise information are applied showing a first side along a shelf edge and then are flipped to show a second side to reflect changes to merchandise information without the need to install new rows, and wherein the first side contains product information on one seasonal product, and the second side contains product information on a different seasonal product.

6. The method according to claim 1, wherein the one or more merchandise information rolls are self-wound.

7. The method according to claim 1, wherein the printed horizontal rows are wound directly from a printer prior to separation from the adjacent horizontal rows, and wherein the separation is done by the mechanism that automatically separates the rows, and
wherein the mechanism that automatically separates the rows is a part of the printer.

8. The method according to claim 1, wherein the product details received from the retail establishment include bar code information and RFID information.

9. The method according to claim 1, wherein the one or more merchandise information rolls are free of any marking indicative of spacing along shelving or between products.

10. A method for providing merchandise information at a retail establishment comprising the steps of:
a) providing data to a supplier of merchandise information rolls via the internet wherein a user selects a plurality of variables including product details about a plurality of products sold at the retail establishment;
b) providing location information to the supplier via the internet identifying the location of the plurality of products within the retail establishment;
c) receiving one or more merchandise information rolls at the retail establishment, wherein the one or more merchandise information rolls are formed by:
i) printing via a printer including mechanism that automatically separates horizontal rows a plurality of adjacent horizontal rows wherein a sequence of the printed merchandise information within one horizontal row is consistent with product location within one corresponding retail establishment;
ii) separating each horizontal row from any of the adjacent horizontal rows by the mechanism that automatically separates the horizontal rows;
iii) spooling each horizontal row into the one or more merchandise information rolls;
wherein the one or more merchandise information rolls include the merchandise information reflecting the product details provided to the supplier and wherein the sequence of the printed merchandise information on the one or more merchandise information rolls reflects the location information provided to the supplier;
d) identifying the location within the retail establishment identified on the one or more merchandise information rolls, wherein the merchandise information can be immediately attached to shelving or displays of the retail establishment by an application device without first organizing the merchandise information according to product location within the retail establishment;
e) attaching the merchandise information to an edge of a first shelf by the application device, wherein the edge is shaped to accept the merchandise information;
f) locating merchandise onto the shelves according to the merchandise information;
g) selling the merchandise; and
wherein the one or more merchandise information rolls are self-wound.

11. The method according to claim 10, wherein the product details include bar code information and RFID information.

12. The method according to claim 10, wherein the product details include images of retail products to be placed upon corresponding shelves, and
wherein the application device contains a ratchet to control a rate and an amount of merchandise information being dispensed.

13. The method according to claim 10, wherein the one or more merchandise information rolls are free of any marking indicative of spacing along shelving or between products.

* * * * *